United States Patent [19]

Davidson et al.

[11] Patent Number: 4,566,339

[45] Date of Patent: Jan. 28, 1986

[54] CHAIN PULL MONITOR SYSTEM

[75] Inventors: Marion A. Davidson; David B. Kiss, both of Memphis, Tenn.

[73] Assignee: Southern Systems, Inc., Memphis, Tenn.

[21] Appl. No.: 565,150

[22] Filed: Dec. 23, 1983

[51] Int. Cl.[4] .................................................. G01L 5/10
[52] U.S. Cl. .................................... 73/862.39; 73/773; 340/870.38
[58] Field of Search ...................... 73/862.39, 828, 773; 340/870.16, 870.38, 668

[56] References Cited

U.S. PATENT DOCUMENTS

| | | | |
|---|---|---|---|
| 3,378,828 | 4/1968 | Stark | 340/870.38 X |
| 3,759,094 | 9/1973 | Al | 73/862.39 |
| 4,420,755 | 12/1983 | Primbs, Jr. | 340/870.38 |

FOREIGN PATENT DOCUMENTS 2041549  9/1980  United Kingdom ............. 73/862.39

*Primary Examiner*—Charles A. Ruehl
*Attorney, Agent, or Firm*—Walker & McKenzie

[57] ABSTRACT

A system for monitoring and recording the tensile stresses experienced by a moving conveyor chain while in use and under load. The system uses strain gauge, signal conditioning and radio technologies to produce an audio signal remote from the actual conveyor and proportional to the tensile stress on the chain.

12 Claims, 8 Drawing Figures

CHAIN PULL MONITOR SYSTEM

BACKGROUND OF THE INVENTION

1. Field of the Invention

The present invention relates to a system to dynamically monitor and analyze the tensile stresses of a chain conveyor under load.

2. Description of the Prior Art

Various methods have been developed in the past to monitor and analyze the actual tensile stress of a chain conveyor while running and under a load. Some known methods involve simple tension gauges attached to the chain and manually read as the chain moves. Other, more sophisticated known methods involve instrument packages and chart recorders that travel along with the chain. These particular type of systems exhibit several disadvantages, including sensitivity to high temperature and mechanical shock. They also suffer from an inherent time-delay between when the measurements were taken and when they become available for review. Also, other systems have bulky packages attached to the chain or have wires which go to a recorder and must be detached at specific locations where there would be interference, for example at the chain drives, etc.

SUMMARY OF THE INVENTION

The present invention is directed toward providing an improved system for monitoring the tensile stresses of a conveyor chain while under load and in operation. The concept of the present invention is to provide a real-time monitoring of the chain pull experienced by a moving conveyor chain while being used and under load. The portion of the system of the present invention that is attached to the chain is so small that it can remain attached and operative throughout the length of the chain conveyor path as opposed to other systems which must be detached at specific locations where otherwise there would be interference.

The system of the present invention comprises, in general, a sensing means mounted directly to a conveyor chain for sensing the strain experienced by the chain while under load and in operation and for producing an electrical signal based on that strain; a transmitting means electrically coupled to the sensing means for receiving the electrical signal therefrom, converting the electrical signal into radio frequency signal for transmission; and a receiving means for receiving the radio signal from the transmitting means and for presenting the radio signal in a readable or intelligible form.

DESCRIPTION OF THE PREFERRED EMBODIMENT

Figure 1:
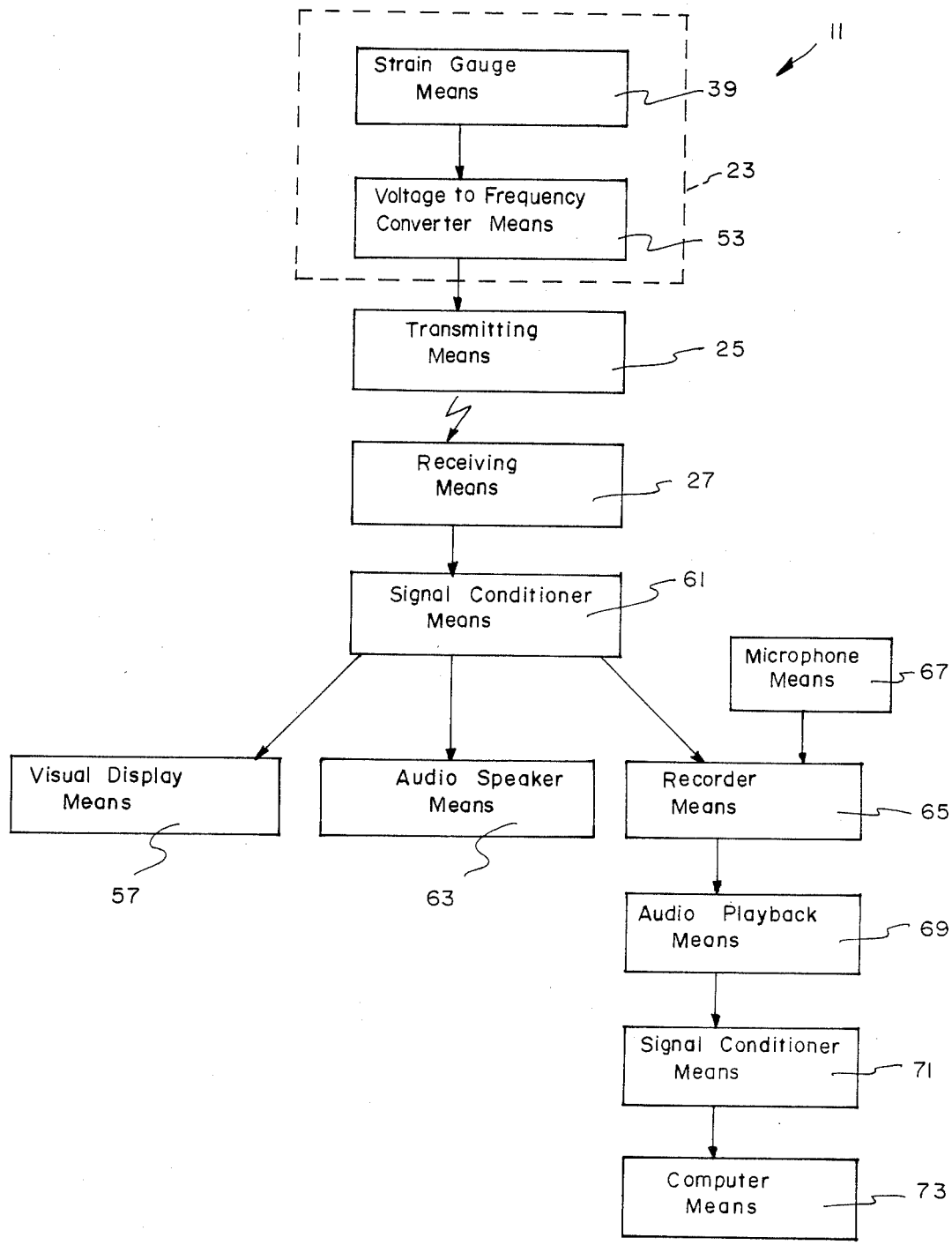
FIG. 1 is a diagrammatic view of the chain pull monitor system of the present invention.
Figure 2:
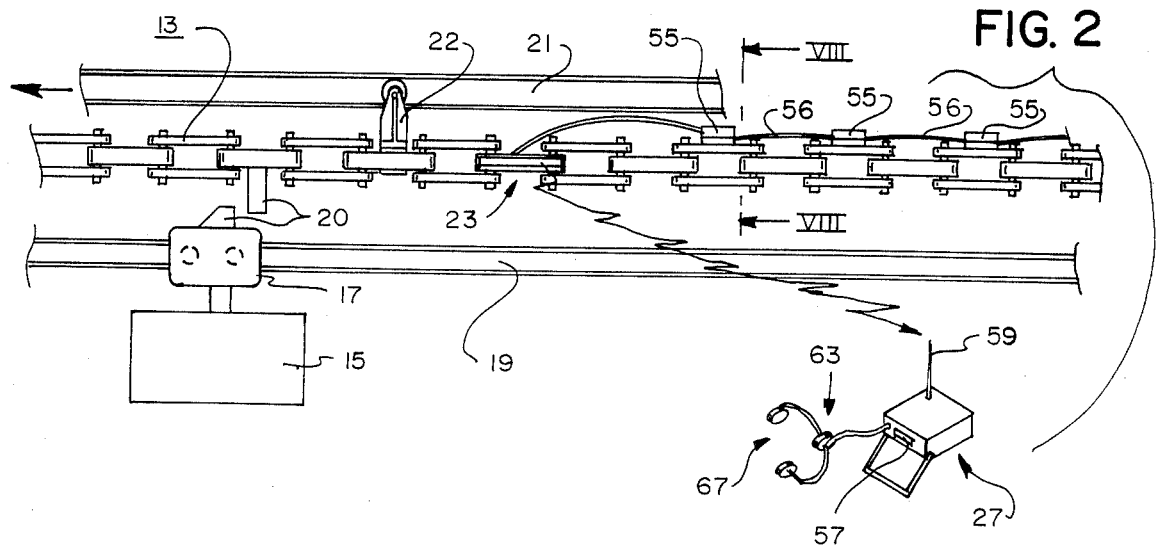
FIG. 2 is a somewhat diagrammatic pictorial view thereof shown associated with a conveyor system.

The chain pull monitor system 11 of the present invention is for use in a conveyor system of the type including a conveyor chain 13 for use in moving a load 15 from one location to another. The conveyor system may be of the type that includes a number of trolleys 17 to which the load 15 may be attached. The trolleys 17 may be movably supported on tracks 19 and operatively coupled to the conveyor chain 13 by coacting pusher elements 20 whereby the conveyor chain 13 can be used to drive the trolleys 17 over the tracks 19 to move the load 15 from one location to another. The chain 13 is supported from a track 21 by trolleys 22 in a manner well-known to those skilled in the art. Thus, the conveyor chain 13 may be positively driven by typical means well-known to those skilled in the art, such as an electric drive motor (not shown). It will be understood that the chain pull monitor system 11 is adapted for use with any type chain conveyor systems, such as the power and free type shown in the drawings or other types, such as overhead monorail chain-driven conveyors or in-floor tow line conveyors.

The conveyor chain 13 will experience various tensile stresses as it moves the trolleys 17 over the tracks 19. The specific stress or tension, in pounds, being exerted by or against the conveyor chain at any specific point in the conveyor system will depend on a number of factors, such as malfunctions in the conveyor path (e.g., faulty traction wheels, rough and binding track, excessive take-up pressures, etc.), the design of the conveyor system at any specific point (e.g., the angle of the tracks 19, the ambient temperature at that specific area, etc.) and the like.

The chain pull monitor system 11 of the present invention allows the actual tensile stress or actual pounds of force (tension) of the conveyor chain 13 to be monitored while running and under a load at any point in the conveyor system. For this information many things may be deduced about the operation of the conveyor system. This includes the following: detecting malfunctions in the conveyor path; drive trouble-shooting; drive location analysis; additional drive requirements and balancing of multiple drive conveyor systems; monitoring the mechanics of the conveyor system through high temperature areas such as ovens or the like; providing a data base of information about conveyor operating characteristics to allow more efficient and dependable future designs.

The system 11 comprises, in general, a sensing means 23 mounted directly to the conveyor chain 13 for sensing the strain experienced by the chain 13 while under load and in operation and for producing an electrical signal based on the tension on the chain; a transmitting means 25 coupled to the sensing means 23 for receiving the electrical signal from the sensing means 23, converting the electrical signal into a radio frequency signal for transmission; and receiving means 27 for receiving the radio signal from the transmitting means 25 and for presenting the radio signal in a readable or intelligible form.

Figure 3:
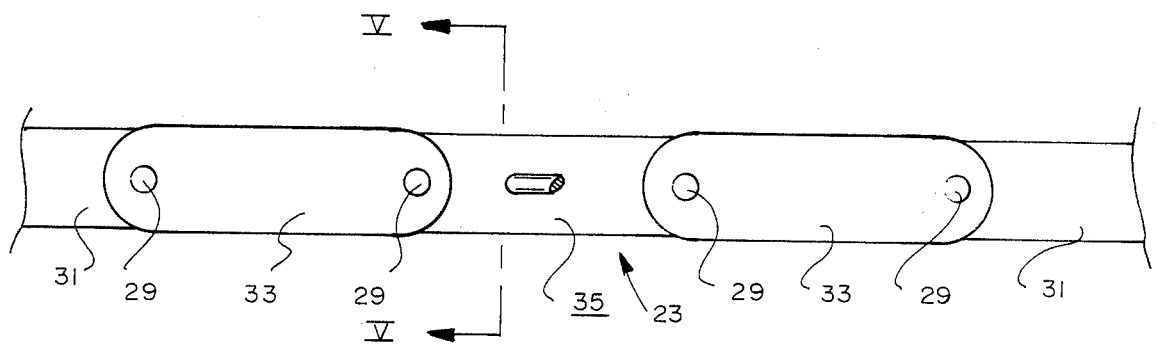
FIG. 3 is an enlarged top view of a portion of FIG. 2.
Figure 4:
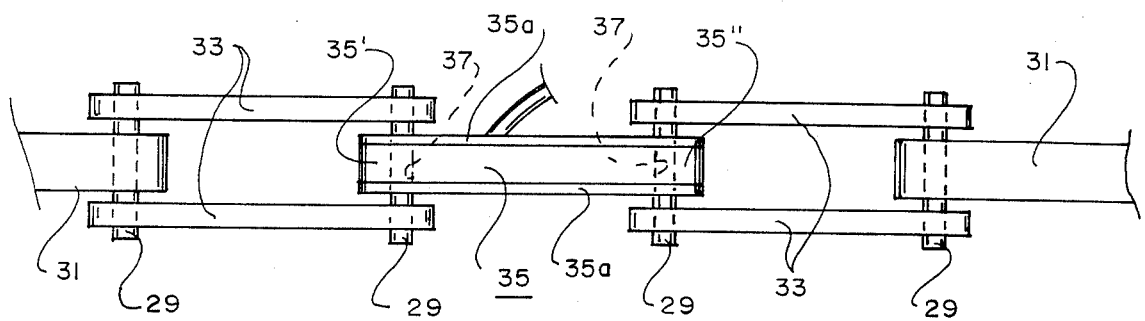
FIG. 4 is a side elevational view of FIG. 3.

The conveyor chain 13 preferably consists of a plurality of link members pivotally joined to one another by pin members 29. The link members preferably consist of two types, a first or male link member 31 consisting of a single elongated member and a second or female link member 33 consisting of a pair of elongated plates for being attached on the top and bottom of the ends of consecutive first link members 31 by the pin members 29 as clearly shown in FIGS. 3 and 4.

Figure 5:
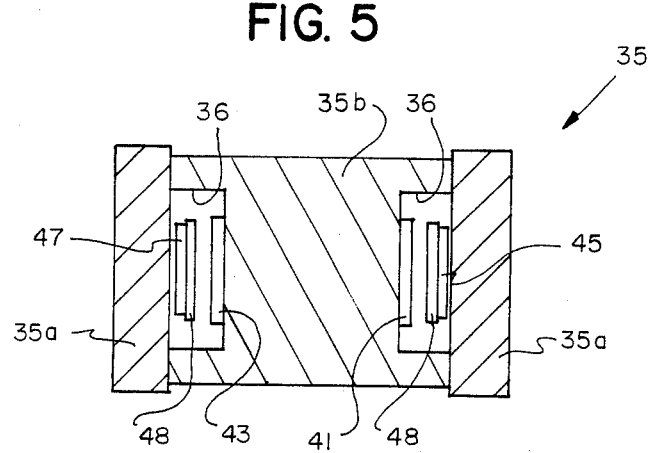
FIG. 5 is an enlarged sectional view substantially as taken on line V—V of FIG. 3 with portions thereof not shown for clarity.
Figure 6:
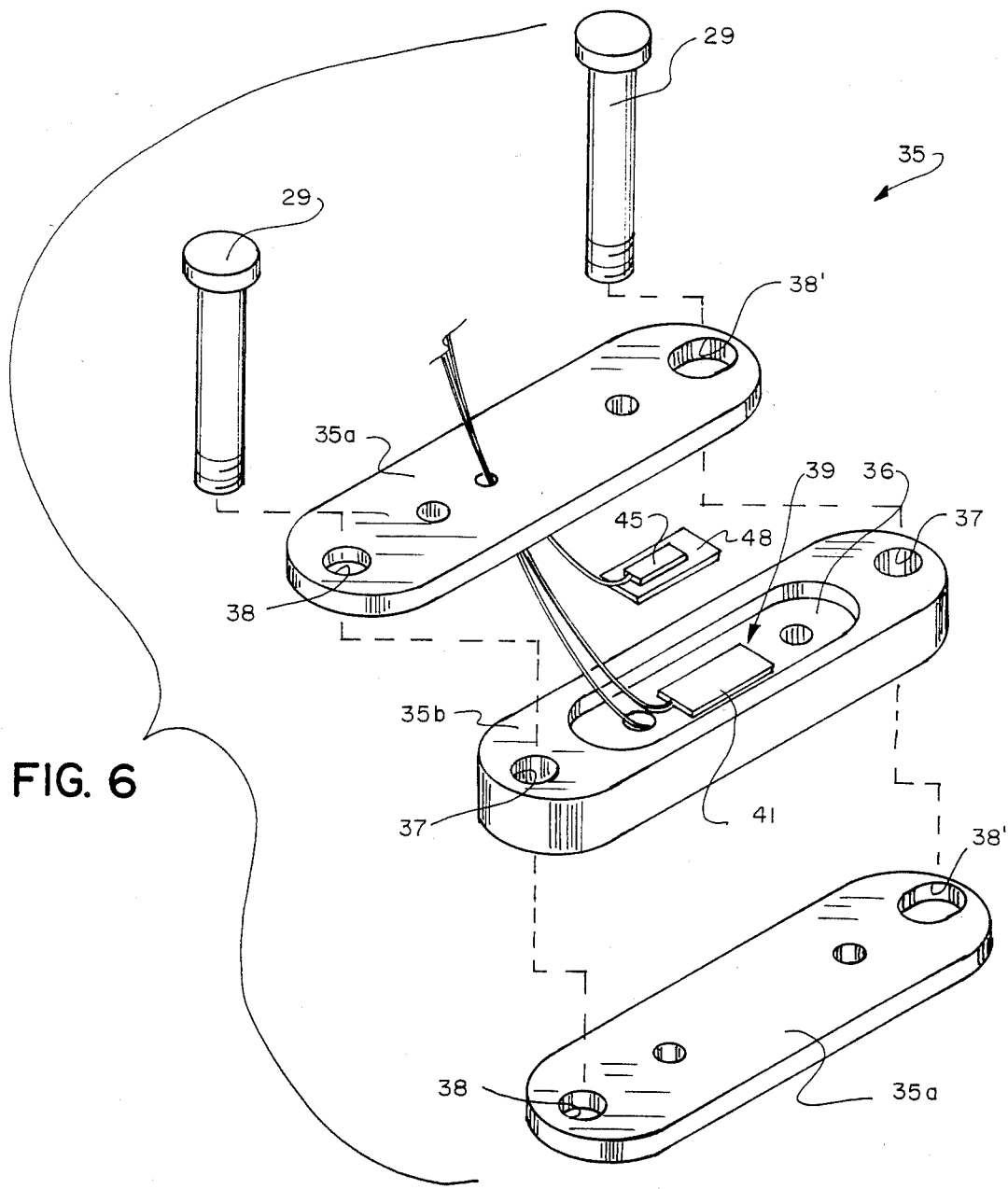
FIG. 6 is an exploded perspective view of a portion of the sensing means of the system of the present invention.
Figure 7:
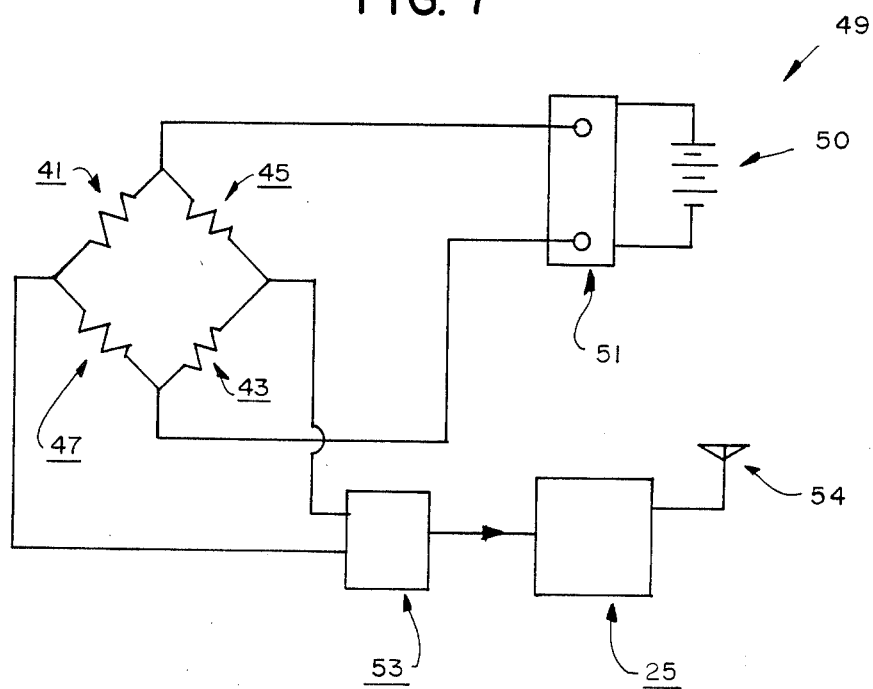
FIG. 7 is an electrical schematic view of a portion of the sensing means of the system of the present invention, showing its connection and relationship with some of the other components of the system.

The sensing means 23 preferably includes an elongated body member 35 having a first end 35′ and a second end 35″. The body member 35 is used to replace one of the first link members 31 of the conveyor chain 13 and is pivotally connected to two adjacent ones of the second link members 33 by a pair of load bearing pin members 29 as clearly shown in FIGS. 3 and 4. The body member 35 preferably includes a pair of elongated plates 35a for being attached to the top and bottom of an elongated center member 35b by pins or screws 29 or the like. The center member 35b preferably has an elongated cavity 36 on the top and bottom thereof and has apertures 37 through the ends thereof through which pins 29 extend. The plates 35a preferably extend beyond the edges of the center members 35b to prevent the center member 35b from being subjected to stress caused by guide members, etc. Also, the plates 35a have apertures 38 through the ends thereof through which pin members 29 extend. One of the apertures, namely aperture 38′, in each of the plates 35a is enlarged, whereby the plates 35a are "floating" so that only center member 35b resists tensile stresses. The sensing means 23 preferably includes an electromechanical strain gauge means 39 for converting mechanical stress into an electrical signal in a manner well-known to those skilled in the art. The strain gauge means 39 preferably includes first and second active resistor elements 41, 43 for producing resistance proportional to the stress applied to the center body member 35b of the sensing means 23. The strain gauge means 39 also preferably includes first and second temperature compensating resistor elements 45, 47 for cancelling any change in resistance produced by the first and second active resistor elements 41, 43 caused by any change in the temperature of the body member 35. The active resistor elements 41, 43 are preferably directly attached to the opposite surfaces of the center member 35b within the cavity 36 (see FIG. 5) for producing resistance proportional to the stress applied to the center member 35b in a manner well-known to those skilled in the art. The temperature compensating resistor elements 45, 47 are preferably attached to plate-like members 48 that are constructed out of the same material as the center member 35b and located within the cavities 36 (see FIG. 5) for producing resistance proportional to the heat applied to the plate-like member 48 in a manner well-known to those skilled in the art. The sensing means 23 also preferably includes a source of electrical energy 49, such as a typical battery or rechargable battery pack 50 which is preferably fed through a precision voltage regulator 51 to the resistor elements 41, 43, 45, 47 for coacting with the resistor elements to produce a low voltage electrical signal proportional to the resistance produced by the resistor element. It will be understood that voltage regulator 51, which is of a construction well-known to those skilled in the art, regulates the voltage going to resistors 41, 43, 45, 47 to a substantially constant value.

The sensing means 23 preferably includes a voltage-to-frequency converter means 53 for amplifying and converting the output of the resistor elements 41, 43, 45, 47 into a frequency output proportional to the voltage output of the strain gauge means 39. The voltage-to-frequency converter means 53 may be of any specific construction well-known to those skilled in the art, such as, for example, the model "AD537" manufactured by Analog Devices of Route 1, Industrial Park, Norwood, Mass. 02062.

The transmitting means 25 may consist of any specific construction well-known to those skilled in the art, as for example, a wireless microphone or the like, such as the FM wireless microphone, catalog number 33-1075, manufactured for the Radio Shack Division of Tandy Corporation of Ft. Worth, Tx. 76102 which has been modified to eliminate the microphone and introduce the signal directly from the voltage-frequency converter 53 into the device. Thus, the transmitting means 25 may include means well-known to those skilled in the art for accepting the output signal of the converter means 53 and for using that output signal to produce a corresponding radio signal for transmission and may include an external wire antenna 54. The transmitting means 25 is preferably powered by the source of electrical energy 49.

Figure 8:
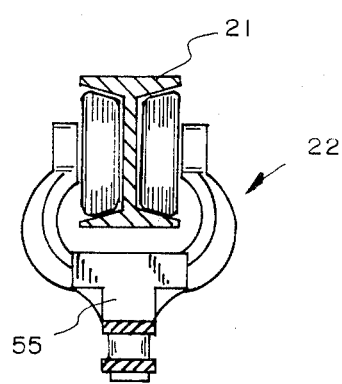
FIG. 8 is an enlarged sectional view taken as on the line VIII—VIII of FIG. 2.

All of the components of the system 11, exclusive of the components mounted within cavities 36, that are mounted on the chain 13, that is, the source of electrical energy 49, the voltage-to-frequency converter means 53, and the transmitting means 25 are housed in small containers 55 which are attached to chain 13 by suitable means, not shown, as bolts or the like. The components in the containers 55 are electrically coupled by the conductors 56 extending between the containers 55. The containers are preferably T shaped as viewed from the end, as in FIG. 8. Also, the containers 55 are of a sufficiently small size to fit within the transverse silhouette of the chain trolleys 22 so that the portion of the system 11 that is attached to the chain can remain attached and operative throughout the length of the conveyor path without interference with any other devices or structure.

A numerical or visual display means 57, well-known to those skilled in the art, is preferably provided for displaying the radio signals received by the receiving means 27 from the transmitting means 25 in a numerical form that indicates the amount of strain which the strain gauge means 39 is subjected to at any specific location in the conveyor system. Thus, the receiving means 27 preferably includes a substantially typical FM receiver 57 having an antenna 59 or the like for receiving the radio frequency carrier signal from the transmitting means 25 and having means for removing the radio signal from the antenna 59 and for reproducing the radio signal in a readable or intelligible form. A source of electrical energy such as a typical battery or rechargable battery pack is provided within the unit to power the receiving means 27. The radio signal received by the FM receiver 57 is then conditioned by a signal conditioning means 61. The signal conditioning means 61 is of any specific construction well-known to those skilled in the art for performing the functions of taking the signal from the receiving means 27 which is a low level analog signal and converting it to three different signals that are compatible respectively with the visual display means 55, the audio speaker means 63 and the recorder means 65. Thus, the signal to the visual display means 55 is converted to a level that is digitally compatible therewith, i.e., the signal is "squared up", the signal to the audio speaker means 63 is simply amplified by well-known means to a level to drive the audio speaker means, and the signal to the recorder means 65 is converted by means of a simple R-C time constant network that decreases the signal level and introduces an equalization to be compatible with the tape recorder means.

The visual display means 55 preferably includes a typical LED or LCD digital display to allow the modulation frequency of the radio frequency signal transmitted by the transmitting means 25 and, thus, the value of the stress which the strain gauge means 39 is then being subjected to, to be easily read.

The audio speaker means 63 which is preferably a part of receiving means 27 and well-known to those skilled in the art receives a conditioned signal from the signal conditioner means 61 and produces an audible signal based thereon. Such an audible signal will consist of a tone based on the frequency of the signal being transmitted by the transmitting means 25. The audio speaker means 63 may consist simply of a typical earphone type speaker for being worn by the operator of the receiving means 27.

Recorder means 65 which is preferably included in system 11 receives a conditioned signal from the signal conditioning means 61 for making an audio record of the radio signal being transmitted by the transmitting means 25. The system 11 also preferably includes a microphone means 67 for allowing the user of the receiving means 27 to record various facts concerning the conveyor system or the like through the recorder means 65 as the recorder means 65 is making a record of the radio signal. Thus, the microphone means 67 allows the operator of the receiving means 27 to make a record of the exact location of the strain gauge means 39 as the recorder means 65 makes a record of the signal being transmitted by the transmitting means 25 at that exact location. The microphone means 67 may be an integral part of the earphone means of the audio speaker means 63 as will be well-known to those skilled in the art. The recorder means 65 may consist of any typical stereotype cassette recorder or the like well-known to those skilled in the art, thereby allowing the radio signal to be recorded on one track thereof and allowing verbal information to be added on the other track thereof by way of the microphone means 67.

The system 11 preferably includes an analysis section for analyzing the record of the audio frequency signal made by the recorder means 65. The analysis section preferably includes an audio tape playback means 69 for producing a signal from the record of the radio signal produced by the recorder means 65, a signal conditioning means 71, and a computer means 73 for analyzing the signal from the signal conditioning means 71 and for producing a chain pull analysis report therefrom, as well-known to those skilled in the art. The signal conditioning means 71 modifies and converts the signal from the audio tape playback means to be electrically compatible with computer means 73.

The use of the system 11 is quite simple. First, one of the link members 31 of the conveyor chain 13 is replaced with the body member 35 of the sensing means 23 to allow the sensing means 23 and transmitting means 25 to move with the conveyor chain 13 throughout the conveyor system. The operator of the receiving means 27, which is preferably of a size to be hand-held, then merely walks adjacent the path of the conveyor chain 13 usually in sight of the body member 35 to obtain a real-time monitoring of the chain pull by merely noting the location of the body member 35 and the numerical value displayed by the visual display means 57 which is proportional to the stress which the body means 35 is then subjected to. If desired, the operator can also listen to the audio frequency signal being transmitted by the transmitting means 25 by way of the speaker means 63. Since there is a correspondence between chain pull and frequency of audio signal, an operator may obtain a wealth of information by listening directly to the audible tone produced. Thus, the operator may directly monitor the chain pull. With experience, problem areas may be detected quickly. Also, he can, if desired, make a record of the signal by way of the recorder means 65 and can add verbal information to the record by way of the microphone means 67. The record can then later be used to produce, in report form, the dynamic chain pull analysis for that conveyor system.

As thus constructed and used, the chain pull monitor system 11 of the present invention allows the tensile stresses experienced by a moving conveyor chain to be monitored and recorded while being used and under load, thus providing a real-time monitoring of the chain pull as well as allowing a simple computer-generated analysis of the recorded data. The system 11 uses strain gauge, signal conditioning and radio technologies to produce an audio signal, remote from the actual conveyor, that is proportional to the conveyor chain's tensile stress, thus allowing malfunctions in the conveyor path, such as faulty traction wheels, rough and binding track, excessive take-up pressures, etc., to be quickly and easily detected while providing a data base of information about conveyor operating characteristics to allow more efficient and dependable conveyor system designs.

Although the present invention has been described and illustrated with respect to a preferred embodiment thereof and a preferred use therefore, it is not to be so limited since changes and modifications can be made therein which are within the full intended scope of the invention.

We claim:

1. A chain pull monitor system for monitoring the tensile stresses of a conveyor chain while under load and in operation, said system comprising:

(a) sensing means mounted directly to said chain for sensing the strain experienced by said chain while under load and in operation and for producing an electrical signal based on said strain; said conveyor chain including a plurality of elongated first link members, a plurality of elongated second link members, and a plurality of pin members; each of said link members having first and second ends and having transverse apertures through said first and second ends; said pin members extending through said transverse apertures in said link member to pivotally join said link members to one another; said sensing means including an elongated body member for replacing one of said first link members of said conveyor chain, said body member including an elongated center member and a pair of elongated plates sandwiching said center member therebetween, said center member and each of said elongated plates having first and second ends and having transverse apertures through said first and second ends, said body member being pivotally connected to two adjacent ones of said second link members by a pair of said pin members extending through said transverse apertures through said first and second ends of said center member and said elongated plates, one of said transverse apertures through each of said elongated plates being enlarged so that only said center member resists tensile stresses;

(b) transmitting means mounted on said chain and coupled to said sensing means for receiving said electrical signal from said sensing means, converting said electrical signal into a radio signal for the transmission thereof; and (c) receiving means for receiving said radio signal from said transmitting means and for presenting said radio signal in an intelligible form.

2. The system of claim 1 in which said center member of said body member has a pair of cavities therein, and in which said sensing means includes an electromechanical strain gauge means for converting mechanical stress into an electrical signal, said strain gauge means including first and second active resistor elements attached to said center member within said cavities thereof for producing resistance proportional to the stress applied to said center member of said body member of said sensing means.

3. The system of claim 2 in which said strain gauge means includes first and second temperature compensating resistor elements for cancelling any change in resistance produced by said first and second active resistor elements caused by any change in temperature of said body member.

4. The system of claim 2 in which said sensing means includes a source of electrical energy coupled to said resistor elements of said strain gauge means for coacting with said resistor elements to produce a low voltage electrical signal proportional to the resistance produced by said resistor elements.

5. The system of claim 4 in which said sensing means includes a voltage-to-frequency converter means for amplifying and converting said electrical signal produced by said source of electrical energy and said resistor elements into a frequency output proportional to said electrical signal of said strain gauge means.

6. A chain pull monitor system for monitoring the tensile stresses of a conveyor chain while under load and in operation, said system comprising:

(a) sensing means mounted directly to said chain for sensing the strain experienced by said chain while under load and in operation and for producing an electrical signal based on said strain; said conveyor chain including a plurality of elongated first link members, a plurality of elongated second link members, and a plurality of pin members; each of said link members having first and second ends and having transverse apertures through said first and second ends; said pin members extending through said transverse apertures in said link member to pivotally join said link members to one another; said sensing means including an elongated body member having first and second ends and having transverse apertures through said first and second ends, said body member replacing one of said first link members of said conveyor chain and being pivotally connected to two adjacent ones of said second link members by a pair of said pin members; said sensing means including an electromechanical strain gauge means for converting mechanical stress into an electrical signal, said strain gauge means including first and second active resistor elements for producing resistance proportional to the stress applied to said body member of said sensing means; said sensing means including a source of electrical energy coupled to said resistor elements of said strain gauge means for coacting with said resistor elements to produce a low voltage electrical signal proportional to the resistance produced by said resistor elements; said sensing means includes a voltage-to-frequency converter means for amplifying and converting said electrical signal produced by said source of electrical energy and said resistor elements into a frequency output proportional to said electrical signal of said strain gauge means;

(b) transmitting means mounted on said chain and coupled to said sensing means for receiving said electrical signal from said sensing means, converting said electrical signal into a radio signal for the transmission thereof;

(c) receiving means for receiving said radio signal from said transmitting means and for presenting said radio signal in an intelligible form;

(d) a track;

(e) trolleys for supporting said chain from said track; and (f) containers in which said transmitting means, said source of electrical energy and said voltage-to-frequency converter means are housed, said containers being attached to said chain and being of a sufficiently small size and so positioned to fit within the transverse silhouette of said trolleys.

7. The system of claim 6 in which is included a numerical display means for displaying said radio signal in a numerical form.

8. The system of claim 7 in which said receiving means includes speaker means for presenting said radio signal in an audible form.

9. The system of claim 8 in which said receiving means includes an audio recording means for making a record of said radio signal and includes a microphone means for allowing verbal information to be added to said record of said radio signal.

10. The system of claim 9 in which is included an analysis means for analyzing said record of said radio signal.

11. The system of claim 10 in which said analysis means includes an audio tape playback means for producing a signal from said record of said radio signal, includes a signal conditioning means for modifying and converting said signal from said audio tape playback means, includes a computer means for analyzing said signal from said signal conditioning means and for producing a chain pull analysis report therefrom.

12. A chain pull monitor system for monitoring the tensile stresses of a conveyor chain while under load and in operation, said system comprising:

(a) sensing means mounted directly to said chain for sensing the strain experienced by said chain while under load and in operation and for producing an electrical signal based on said strain; said sensing means including a body member interposed in said chain and including first and second active resistor elements for producing resistance proportional to the stress applied to said body member; said sensing means including a source of electrical energy coupled to said resistor elements for coacting with said resistor elements to produce a low voltage electrical signal proportional to the resistance produced by said resistor elements and including a voltage-to-frequency converter means for producing a voltage output proportional to the electrical signal produced by the coaction between said source of electrical energy and said resistor elements;

(b) transmitting means mounted on said chain and coupled to said sensing means for receiving said electrical signal from said sensing means, converting said electrical signal into a radio signal for the transmission thereof;

(c) receiving means for receiving said radio signal from said transmitting means and for presenting said radio signal in an intelligible form;

(d) a track;

(e) trolleys for supporting said chain from said track; and (f) containers in which said transmitting means, said source of electrical energy and said voltage-to-frequency converter means are housed; said containers being attached to said chain and being of a sufficiently small size and so positioned to fit within the transverse silhouette of said trolleys.

* * * * *